United States Patent [19]
Globig et al.

[11] Patent Number: 5,944,241
[45] Date of Patent: Aug. 31, 1999

[54] COMBINATION SEAT AND STORAGE ENCLOSURE

[76] Inventors: James E. Globig, 447 Claxton Glen Ct., Kettering, Ohio 45429; Kenneth Neil Allen, 4909 Far Hills Ave. Apt. D1, Kettering, Ohio 45429-2339

[21] Appl. No.: 08/888,451

[22] Filed: Jul. 7, 1997

[51] Int. Cl.[6] .............................. A45F 4/00; E04G 3/00; A47C 13/00
[52] U.S. Cl. ................ 224/577; 224/576; 224/679; 224/681; 224/240; 224/241; 224/155; 182/187; 197/188.13; 197/129
[58] Field of Search .................... 224/576, 155, 224/578, 679, 681, 577, 235, 241, 240; 182/187; 297/188.08, 188.13, 129; 108/152; 220/212, 521, 522, 503, 558

[56] References Cited

U.S. PATENT DOCUMENTS

| | | | |
|---|---|---|---|
| 2,615,563 | 10/1952 | Sundberg et al. | 220/522 |
| 3,368,725 | 2/1968 | Martin . | |
| 3,730,294 | 5/1973 | Thurmond . | |
| 4,022,292 | 5/1977 | Van Gompel . | |
| 4,148,376 | 4/1979 | Campbell, Jr. . | |
| 4,776,503 | 10/1988 | Sink . | |
| 4,928,793 | 5/1990 | Westimayer et al. . | |
| 4,989,766 | 2/1991 | Lewallyn et al. . | |
| 5,381,941 | 1/1995 | Brune . | |
| 5,492,256 | 2/1996 | Ive | 224/679 |
| 5,522,186 | 6/1996 | Jarman . | |

*Primary Examiner*—Linda J. Sholl
*Attorney, Agent, or Firm*—Killworth, Gottman, Hagan, Schaeff L.L.P.

[57] ABSTRACT

The present invention provides a portable storage enclosure which can be used as a seat. The device includes a storage enclosure defining a storage cavity, and an access opening thereto. A door is mounted on the storage enclosure. The door is movable from a position at which it covers the access opening to a position at which it permits access to the storage cavity. A belt is attached to the storage enclosure. The belt is adjustable from a first position at which the belt can be secured about a wearer's waist to a second position at which the belt can be secured around a generally vertical support, such as a tree or utility pole. The apparatus of the present invention is designed so that the wearer can remove the storage enclosure from the wearer's waist, attach the storage enclosure to the generally vertical support by the belt, and use the storage enclosure as a seat.

16 Claims, 4 Drawing Sheets

COMBINATION SEAT AND STORAGE ENCLOSURE

FIELD OF THE INVENTION

The present invention relates to sports equipment, and particularly to an apparatus useful for camping, hiking, hunting, and other outdoor activities.

BACKGROUND OF THE INVENTION

Commonly, people involved in outdoor activities wish to rest from their activity or, in the case of hunters, need to wait for game to arrive at the hunting ground. Often, it is difficult or impossible to sit on the ground because of, for example, rocky terrain, mud, or thick underbrush. For these reasons, it is desirable to sit in a position not on the ground. However, it is uncomfortable to sit in a tree and too time consuming to construct a tree stand, assuming one would have the necessary equipment available.

One solution has been to provide a portable seat which can be attached to a tree to allow a person to sit using the tree as a support. For example, backpacks have been developed which are convertible in some manner into a seat. See, for example, U.S. Pat. No. 3,730,294 to Thurmond, and U.S. Pat. No. 4,148,376 to Campbell, Jr. However, hikers and hunters do not always wish to carry a bulky backpack for short hikes and day trips. Also, it is difficult to carry other items, such as a rifle, when carrying a backpack.

Another solution has been to provide a smaller seat which can be carried on the back or waist. For example, U.S. Pat. No. 4,928,793 to Westimayer et al. describes a seat which is worn about the waist. The seat includes a rigid frame which is covered with a covering made of heavy canvass or duck material. However, this arrangement is undesirable because noise is created removing the covering from the frame and it is not desirable, when outdoors, to leave the covering on the frame for long periods of time because the covering may be damaged. Further, the storage area defined by the covering can not be easily accessed by a person sitting on the seat.

Other devices have been proposed but those devices require some type of assembly before they can be used or they incorporate some type of metal chain which may generate noise. See, for example, U.S. Pat. Nos. 3,368,725; 4,022,292; and 5,381,941.

For these reasons, a need has developed in the art for a compact portable seat which includes additional storage space. A need also exists for a portable storage enclosure which can be used as a seat.

SUMMARY OF THE INVENTION

The present invention solves the currently existing needs in the art by providing a portable storage enclosure which can be used as a seat. The present invention also provides a portable seat which includes storage space.

The present invention is directed to a combination seat and storage device. The device comprises a storage enclosure defining a storage cavity, and an access opening thereto. A door is mounted on the storage enclosure. The door is movable from a position at which it covers the access opening to a position at which it permits access to the storage cavity. A belt is attached to the storage enclosure. The belt is adjustable from a first position at which the belt can be secured about a wearer's waist to a second position at which the belt can be secured around a generally vertical support, such as a tree or utility pole. The apparatus of the present invention is designed so that the wearer can remove the storage enclosure from the wearer's waist, attach the storage enclosure to the generally vertical support by the belt, and use the storage enclosure as a seat.

The apparatus of the present invention desirably includes a curved portion having a radius of curvature which approximates a radius of the wearer's waist to provide a more comfortable and secure fit for the storage enclosure about the wearers waist. More desirably, the apparatus also includes a support engaging portion which facilitates engagement of said storage enclosure with the generally vertical support.

To further make the storage enclosure fit more comfortably and secure about the wearer's waist, the apparatus desirably includes a pair of belt retainers positioned on each side of the storage enclosure. Each belt retainer extends from a side of the storage enclosure and is positioned so that the belt can be threaded through the belt retainers to stabilize the storage enclosure as it is worn about the wearer's waist.

Another aspect of the present invention is directed to a combination seat and storage device. The device comprises a storage enclosure defining a storage cavity, and an access opening thereto. The storage enclosure further includes a first side having a support engaging portion and two laterally disposed portions having larger radii for engaging a waist of a wearer. A belt is attached to the storage enclosure. The belt is adjustable from a first position at which the belt can be secured about the waist of the wearer to a second position at which the belt can be secured around a generally vertical support. The storage enclosure can be worn about the wearer's waist by engaging the wearer's waist with the two laterally disposed portions and adjusting the belt to the first position. The storage enclosure can be secured to the generally vertical support by engaging the support engaging portion with the generally vertical support and adjusting the belt to the second position.

Other objects and advantages of the invention will be apparent from the following detailed description, the accompanying drawings and the appended claims.

DETAILED DESCRIPTION OF THE INVENTION

Figure 1:
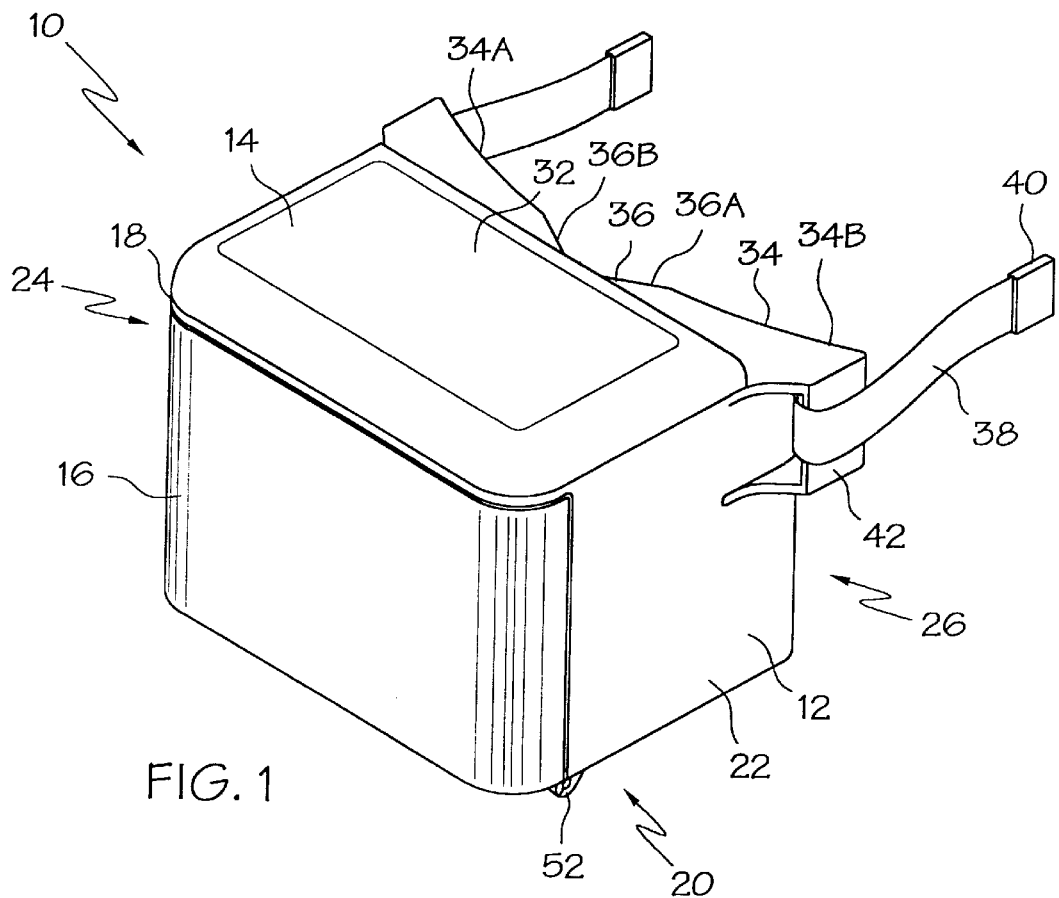
FIG. 1 presents a perspective view of the combination seat and storage device of this invention.
Figure 3:
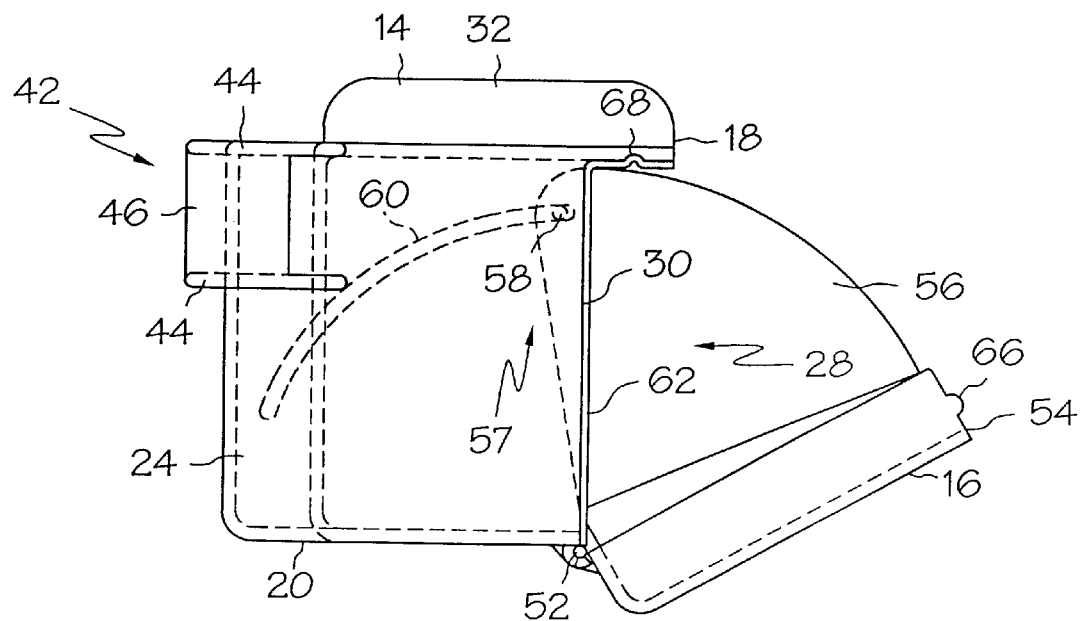
FIG. 3 presents a side view of the combination seat and storage device of this invention.

A perspective view of the combination seat and storage device 10 of the present invention is shown in FIG. 1. The combination seat and storage device 10 includes a storage enclosure 12, a seat 14 and a door 16. The storage enclosure 12 comprises a first horizontal wall or top wall 18, a second horizontal or bottom wall 20, a first vertical or side wall 22, a second vertical or side wall 24, and a third vertical or rear wall 26. The top wall 18, bottom wall 20, side wall 22, side wall 24 and rear wall 26 define a storage cavity 28 and an access opening 30 to the storage cavity 28, which are best seen in FIG. 3. Seat 14 is positioned on top wall 18. Seat 14 may also include a padded portion 32 to make it more comfortable to sit upon. Seat 14 may optionally include a pocket (not shown) into which a warming device, such as a chemical warmer, a rifle or hands may be inserted to keep them warm and dry. The pocket may also be used to store gloves or other useful items. Seat 14 may also be generally contoured to fit the buttocks and legs of the wearer. Door 16 is movable from a first position at which it covers the access opening 30 to at least one other position at which it permits access to storage cavity 28.

As can also be seen in FIG. 1, the rear wall 26 is positioned on an opposite side of the storage enclosure 12 from the door 16. The rear wall 26 includes a rounded waist engaging portion 34 and a support engaging portion 36. Waist engaging portion 34 includes two laterally disposed, curved portions 34a and 34b. Support engaging portion 36 includes a first support engaging surface 36a and a second support engaging surface 36b. Waist engaging portion 34 is provided so that the combination seat and storage device 10 can more comfortably fit the waist of a wearer, as will be described below, and support engaging portion 36, as will also be discussed in more detail below, is provided so that the combination seat and storage device 10 can more effectively engage generally vertical supports, such as trees or utility poles, to attach the combination seat and storage device 10 to the generally vertical support.

With continuing reference to FIG. 1, the combination seat and storage device 10 also includes an adjustable length belt 38 which is associated with the rear wall 26. A buckle 40 is attached to the ends of belt 38. As can also be seen in FIG. 1, a pair of belt retainers 42 are positioned on each side of storage enclosure 12. Belt retainers 42 are positioned so that belt 38 can be threaded through them to stabilize the combination seat and storage device 10 when it is worn about a wearer's waist.

Figure 2:
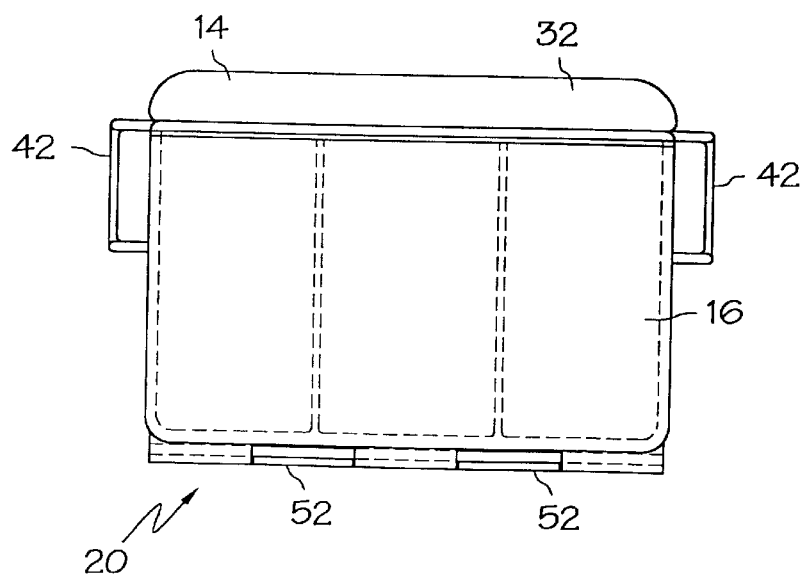
FIG. 2 presents a front view of the combination seat and storage device of this invention.

A front view of door 16 is shown in FIG. 2. The door 16 is attached to the storage enclosure 12 by at least one hinge 52. Although two hinges 52 are shown in FIG. 2, door 16 may have only one hinge 52 which extends substantially along the length of storage enclosure 12. Hinges 52 are positioned on bottom wall 20 so that door 16 can be opened down and away from storage enclosure 12, thereby allowing the user/wearer to access storage enclosure 12 while sitting upon seat 14 without spilling the contents of storage enclosure 12.

Figure 4:
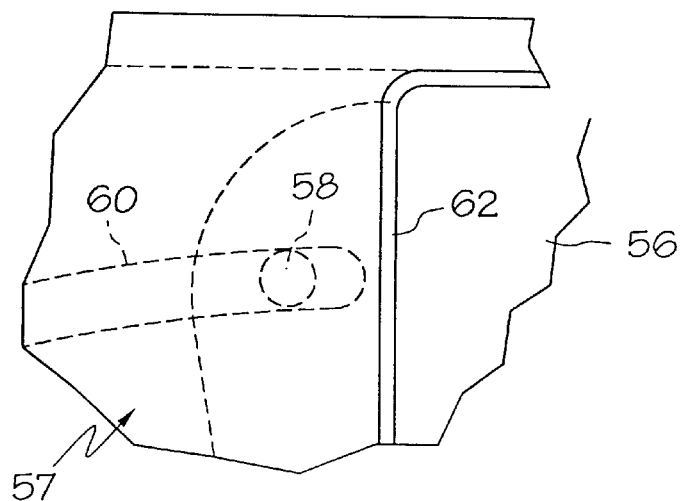
FIG. 4 presents an enlarged view of the door retaining means shown in FIG. 3.

A side view of the combination seat and storage device 10 is shown in FIG. 3. As can be seen in FIG. 3, door 16 opens downwardly and away from storage enclosure 12. Door 16 remains in a closed position by means of a friction fit between its top surface 54 and top wall 18. Door 16 includes a pair of flanges 56, one shown, on each of its sides. Flanges 56 are formed as part of door 16 and extend outwardly from door 16. Each flange 56 includes a door retainer 57 which is shown in detail in FIG. 4. In one embodiment shown in FIGS. 3 and 4, door retainer 57 includes two pins 58, one shown, one of which projects perpendicularly from each flange 56. Pins 58 detachably engage slots 60, one shown in phantom lines in FIGS. 3 and 4, formed on the inside of side walls 22 and 24 of storage enclosure 12. The engagement between pins 58 and slots 60 allows door 16 to be partially opened so that storage enclosure 12 can be accessed while preventing door 16 from opening completely and allowing the contents of storage enclosure 12 to fall out of storage enclosure 12. Desirably, the engagement of pins 58 with slots 60 will prevent door 16 from opening no more than 60°, thereby allowing access to storage cavity 28 while preventing the contents of storage cavity 28 from falling out.

As can also be seen in FIG. 3, a seal 62 is mounted around the outer periphery of storage cavity 28 surrounding access opening 30 to prevent liquids and other substances from entering storage cavity 28 and damaging the contents of storage cavity 28. Seal 62 is mounted on top wall 18, side wall 22, bottom 20 and side wall 24. Alternately, seal 62 can be mounted around the periphery of door 16 to provide an equally effective seal.

In one aspect of the invention, to maintain door 16 in a closed position, door 16 desirably includes on its top surface 54 a nipple 66 which engages a correspondingly positioned dimple 68 on the inside surface 70 of top wall 18 of storage enclosure 12, as can be seen in FIG. 3. Desirably, door 16 will include more than one nipple 66 and storage enclosure 12 will include more than one corresponding dimple 68. Nipple 66 frictionally engages dimple 68 to maintain door 16 in a closed position. Door 16 is opened by applying an amount of force necessary to overcome the frictional engagement of nipple 66 with dimple 68. Alternatively, door 16 may be maintained in a closed position by means of a conventional latch, not shown, attached to the outside of storage enclosure 12. The attachment and positioning of such a latch is within the skill of a person of skill in the art and will not be discussed in further detail.

The belt retainers 42 are also shown in FIG. 3. One belt retainer 42 is positioned on each side of storage enclosure 12. Belt retainers 42 extend outwardly from side walls 24 and 26 of storage enclosure 12. Each belt retainer 42 has a pair of horizontal support members 44 and a vertical arm 46 which extends between the horizontal support members 44. Desirably, belt retainers 42 will be formed as an integral part of storage enclosure 12, i.e., molded simultaneously with storage enclosure 12.

Figure 5:
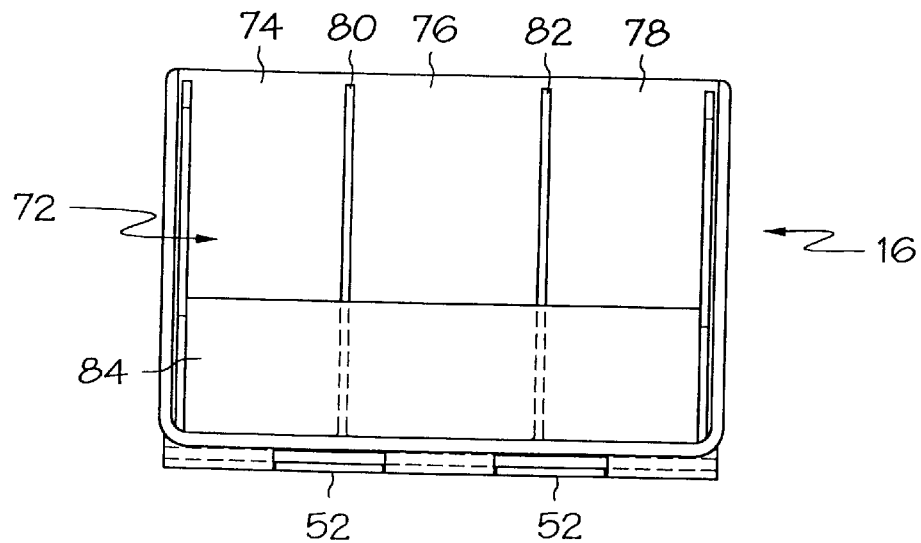
FIG. 5 presents a view of the door of the combination seat and storage device of the present invention shown from inside the storage enclosure.

With reference to FIG. 5, it can be seen that door 16 includes an additional storage area 72. Storage area 72 can be separated into separate storage compartments 74, 76 and 78 by means of partitions 80 and 82. Objects are retained in storage area 72 by means of a wall 84, which is desirably formed integrally with door 16. Desirably, storage compartments 74, 76 and 78 are also an integrally formed part of door 16.

Figure 6:
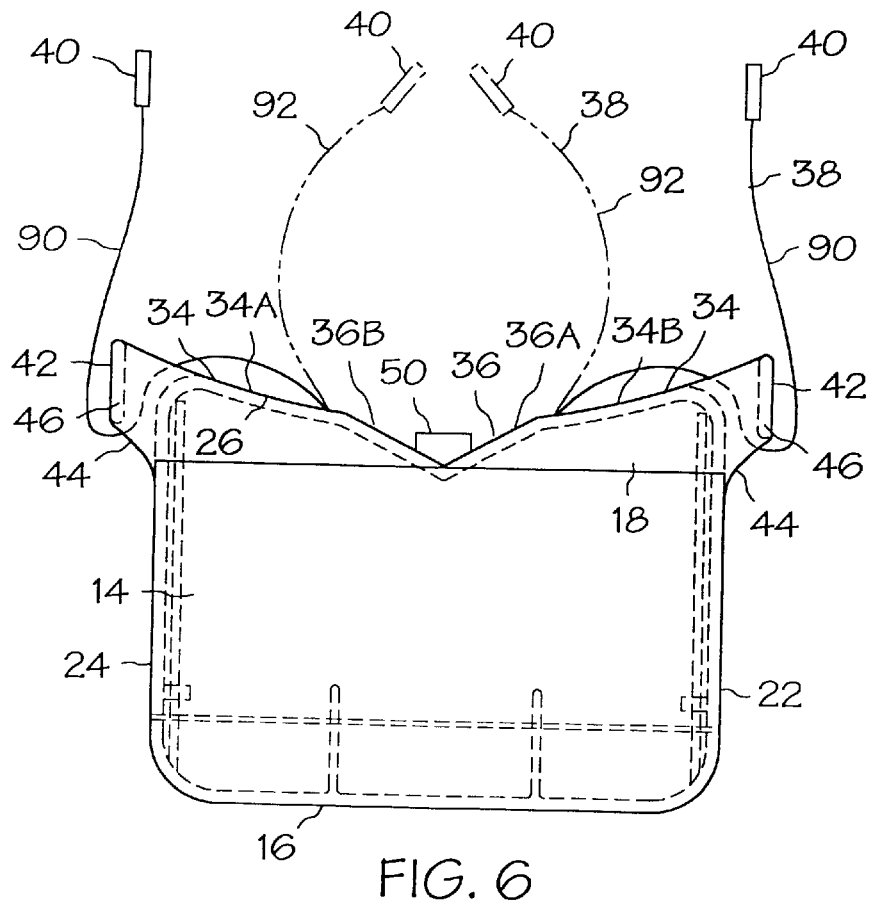
FIG. 6 presents a top view of the combination seat and storage device of the present invention.

As can be seen in FIG. 6, rear wall 26 includes a waist engaging portion 34 which makes the combination seat and storage device 10 fit more comfortably about a wearer's waist. As stated above, waist engaging portion 34 includes two laterally disposed, curved portions 34a and 34b. Typically, waist engaging portion 34 will have a radius of curvature which approximates the radius of curvature of the wearer's back. Desirably, the radius of curvature of the waist engaging portion 34 will be about 16 inches (about 41 cm). Rear wall 26 also includes a support engaging portion 36 formed in waist engaging portion 34. The support engaging portion 36 has a V-shape which engages the circumference of a generally vertical support, such as a tree or utility pole, to which the device 10 may be attached. The first support engaging surface 36a and the second support engaging surface 36b form the "V" shape. Desirably, the distance between the ends of the first support engaging surface 36a and the second support engaging surface 36b at the open end of the "V" is about 3.5 inches (about 8.9 cm). However, one of skill in the art will understand that the distance between the ends of the first engaging surface 36a and the second engaging surface 36b at the open end of the "V" can be larger or smaller so that the device 10 will more effectively engage a larger or smaller, respectively, vertical support. Desirably, the combination seat and storage device 10 will include a tooth 50 which is provided to engage the vertical support and prevent the storage device 10 from sliding on the vertical support. Tooth 50 extends perpendicularly from rear wall 26 and is desirably positioned so that it does not extend in the radius of the waist engaging portion 34.

Belt 38 is adjustable from a first position 90, at which it can fit around the waist of the wearer, to a second position 92, at which it can fit around a generally vertical support. Belt 38 can be attached to storage enclosure 12 by several different methods. First, belt 38 can be attached to storage enclosure 12 by being threaded through a plurality of belt loops, not shown, which are recessed into the body of storage enclosure 12 to prevent discomfort to the wearer. Desirably, these recessed belt loops will be positioned on the first support engaging surface 36a and the second support engaging surface 36b of the support engaging portion 36. Second, belt 38 can be threaded through storage enclosure 12 itself. If belt 38 is threaded through storage enclosure 12, at least two slots will be formed in storage enclosure 12 to allow belt 38 to pass through storage enclosure 12. The slots will desirably be formed at the ends of support engaging portion 36. Desirably, the slots will include a sealing device, such as an o-ring or other rubberized or plasticized sealing device, to prevent moisture from entering storage enclosure 12. Third, belt 38 can be attached by fasteners, such as screws, rivets, or bolts, to the outside surface of rear wall 26 of storage enclosure 12. If belt 38 is attached by means of fasteners, belt 38 will be attached to storage enclosure 12 along the first support engaging surface 36a and the second support engaging surface 36b of support engaging portion 36 so that the wearer will not be discomforted by the fasteners. It is also contemplated that belt 38 can be formed of a plastic material such that it can be melted to become an integral portion of storage enclosure 12. In this case, the portion of belt 38 which is melted will be that portion of belt 38 which contacts first support engaging surface 36 and second support engaging surface 36b of support engaging portion 36.

As can also be seen in FIG. 6, belt retainers 42 are mounted on each side of storage enclosure 12. Desirably, belt retainers 42 are formed as an integral part of storage enclosure 12. It is also desirable that belt retainers 42 extend outwardly from storage enclosure 12 so that the vertical arm 46 of each belt retainer 42 is in the radius of curvature of waist engaging portion 34.

A top view of seat 14 can also be seen in FIG. 6. Seat 14 is desirably textured so that it will not reflect light and could be heavily textured to create synthetic "hair" to make the device 10 even quieter when wearing it about the waist. This is particularly desirable if seat 14 is used during hunting because light reflected off of the combination seat and storage device 10 could frighten any potential game.

Figure 7:
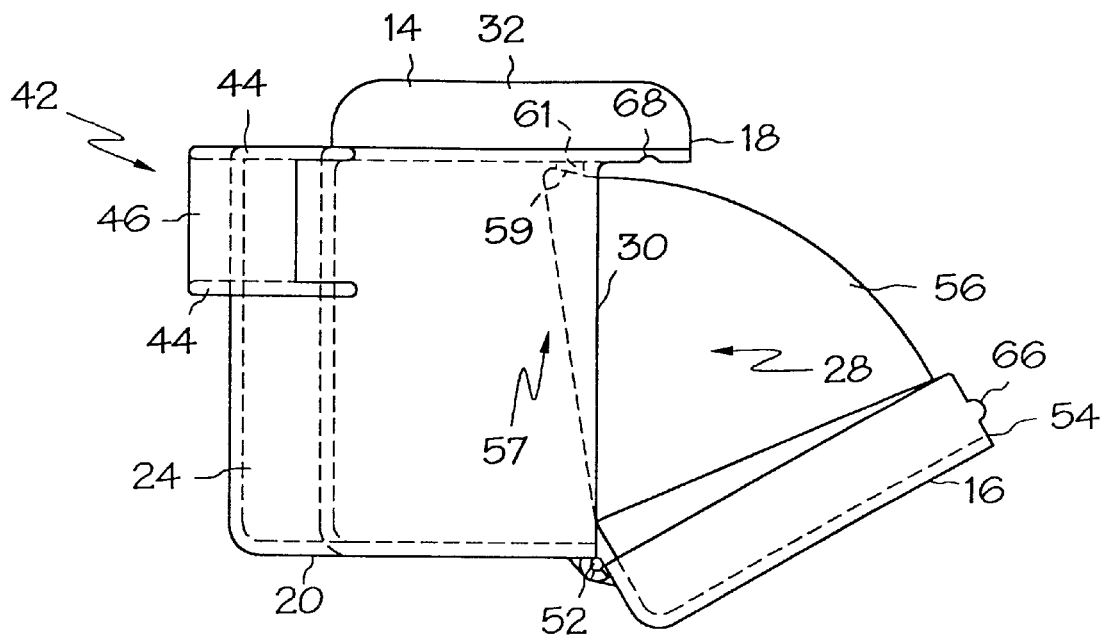
FIG. 7 presents a side view of another aspect of the combination seat and storage enclosure of this invention.
Figure 8:
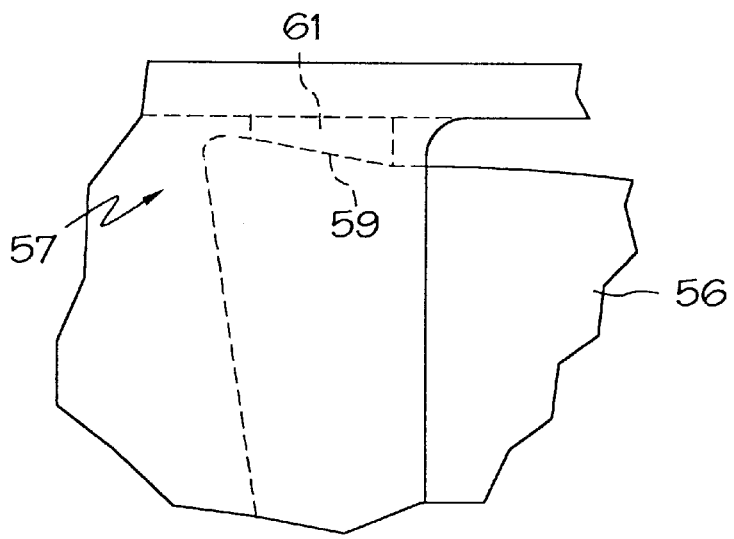
FIG. 8 presents an enlarged view of another version of the door retaining means shown in FIG. 7.

FIGS. 7 and 8 present illustrations of an alternate embodiment of the door retainer 57. In this embodiment, the door retainer 57 includes a stop flange 59 which is attached to or formed as part of flange 56 and a stop 61. Stop 61 is attached to or formed as part of the upper portion of side wall 24. Desirably, a stop flange 59 will be positioned on each flange 56 on each side of door 16 and a stop 61 will be positioned on side wall 22 and side wall 24. The engagement between stop flanges 59 and stops 61 allows door 16 to be partially opened so that storage enclosure 12 can be accessed while preventing door 16 from opening completely and allowing the contents of storage enclosure 12 to fall out of storage enclosure 12. Desirably, the engagement of stop flanges 59 with stops 61 will prevent door 16 from opening no more than 60°, thereby allowing access to storage cavity 28 while preventing the contents of storage cavity 28 from falling out.

The combination seat and storage device 10 of the present invention is used in the following manner. To wear the combination seat and storage device 10 about the waist, the belt 38 is threaded through the belt retainers 42. Each end of belt 38 is threaded through horizontal support members 44 and around vertical arm 46 on each side of storage enclosure 12. Waist engaging portion 34 on rear wall 26 is then positioned against the wearer's back and the belt 38 is brought around to the front of the wearer where the belt 38 is buckled. The length of belt 38 is adjustable in a conventional manner. Because the combination seat and storage device 10 includes waist engaging portion 34 which approximates the curvature of a wearer's waist, the combination seat and storage device 10 fits comfortably on the wearer's waist. Further, the belt retainers 42 also serve to make the fit around the wearer's waist more secure and to stabilize the combination seat and storage device 10 as it is worn about the waist by reducing rotational movement of the combination seat and storage device 10 which is created as the wearer is walking. One of skill in the art will appreciate that the combination seat and storage device 10 may also be worn so that the belt 38 is buckled behind the wearer and the storage enclosure 12 is positioned on the front of the wearer.

Once the wearer comes to a desired place to sit, the belt 38 is unbuckled and the combination seat and storage device 10 is removed from the wearer's waist. The belt 38 is then removed from the belt retainers 42. The combination seat and storage device 10 is positioned so that first support engaging surface 36a and second support engaging surface 36b of support engaging portion 36 engage a generally vertical support member, such as a tree or utility pole. The belt 38 is then brought around the generally vertical support member and the belt 38 is buckled. To ensure that the combination seat and storage device 10 is secured to the generally vertical support member so that the combination seat and storage device 10 does not slide down the generally vertical support member, the length of belt 38 is adjustable to fit the radius of the generally vertical support member. To also prevent sliding of the combination seat and storage device 10 on the vertical support member, tooth 50 engages the support member. Once securely attached to a generally vertical support member, the wearer can sit upon seat 14.

Because door 16 is configured to open downwardly away from the combination seat and storage device 10, the wearer can access the storage cavity 28 while sitting upon seat 14. Door retainer 57 prevents door 16 from opening completely and allowing the contents of storage enclosure 12 to fall out of the storage cavity 28.

If desired, door 16 can be opened to a position at which it does not limit access to storage cavity 28. To do this, the wearer provides an inward force on the flanges 56 on door 16. This inward force causes the pins 58 to disengage from slots 60, for the embodiment shown in FIGS. 5 and 6, and causes the stop flanges 59 to disengage from the stops 61, for the embodiment shown in FIGS. 7 and 8. Once door retainer 57 has been disengaged, door 16 can be fully opened.

Desirably, rear wall 26 of storage enclosure 12 will have a greater thickness than the other walls of storage enclosure 12. Rear wall 26 will desirably have an increased thickness to add stability to the combination seat and storage device 10 when it is sat upon.

To prevent the combination seat and storage device 10 from making noises while in use, the combination seat and storage device 10 can be fabricated with, covered, coated or insulated with a sound deadening material.

In another aspect of the invention, the combination seat and storage device 10 does not have a door, such as door 16, to cover the access opening 30 to storage cavity 28. In such instances, access opening 30 can be covered with a mesh or netting to prevent objects stored in the storage cavity 28 from falling out of storage cavity 28. Desirably, the mesh or netting is formed from an elasticized material which allows the mesh or netting to be stretched taught across access opening 30. One of skill in the art will also appreciate that it is not necessary or required that access opening 30 be covered in any manner as long as the wearer does not want to carry anything in storage cavity 28.

The combination seat and storage device 10 of the present invention can be formed from any materials currently used in the art to form such an apparatus. Desirably, the combination seat and storage device 10 of the present invention is formed from a polymeric material, which is desirably a moldable plastic material, so that the storage enclosure 12, door 16 and seat 14 can be easily molded. Desirably, storage enclosure 12 and seat 14 will be molded simultaneously, i.e., as a single unit. Useful polymeric materials include, but are not limited to, polyethylene, polypropylene, polyurethane, polyvinyl chloride, vinyl esters, nylon, polyester and epoxides.

Padded portion 32 of seat 14 can be formed from any material currently in use in the art to make padding. Desirably, padded portion 32 will be formed from a foamed polymeric material such as polyurethane, polyethylene, polypropylene or other similar materials. Padded portion 32 may also be formed from natural fibers but, if natural fibers are used, padded portion should include a covering which would prevent those fibers from becoming wetted.

The belt 38 can be formed from any material currently used to make belts. Desirably, belt 38 will be formed from leather, a rubber material, or a polymeric material. More desirably, belt 38 is formed from a polymeric material such as nylon, polyethylene or polypropylene.

Although storage enclosure 12 is depicted in the drawings as having a generally rectangular shape, the storage enclosure 12 can have any shape which is useful with the invention. For example, storage enclosure 12 can have a half barrel shape. As another example, storage enclosure 12 can have a right triangular shape with the hypotenuse of the triangle being the portion of the storage enclosure which is positioned next to the wearer's waist. Desirably, whatever shape the storage enclosure 12 takes, the storage enclosure 12 will include both waist engaging portion 34 and support engaging portion 36.

Having described the invention in detail and by reference to preferred embodiments thereof, it will be apparent that modifications and variations are possible without departing from the scope of the invention which is defined in the appended claims.

What is claimed is:

1. A combination seat and storage device comprising:
    a storage enclosure defining a storage cavity, and an access opening thereto, said storage enclosure further defining a curved portion having a radius of curvature which approximates a radius of the wearer's waist;
    a door mounted on said storage enclosure, said door being movable from a position at which it covers said access opening to a position at which it permits access to said storage cavity through said access opening; and
    a belt attached to said storage enclosure, the attachment of said belt to said enclosure being adjustable from a first attachment position at which said belt can be secured about a wearer's waist, to a second attachment position at which said belt can be secured around a generally vertical support;
    wherein the wearer can remove said storage enclosure from the wearer's waist, attach said storage enclosure to the generally vertical support by said belt, and use said storage enclosure as a seat;
    wherein said storage enclosure further defines a support engaging portion which facilitates engagement of said storage enclosure with the generally vertical support; and wherein said support engaging portion includes a first support engaging portion and a second support engaging portion, said first support engaging portion and said second support engaging portion forming a V-shape.

2. The combination seat and storage device of claim 1 wherein said door further includes storage compartments contained therein.

3. The combination seat and storage device of claim 2 wherein said door is attached to said storage enclosure by at least one hinge and said door includes at least one flange which limits the extent to which said door can be opened.

4. The combination seat and storage device of claim 3 wherein at least one of said storage enclosure and said door further includes a sealing ring, said sealing ring surrounding said access opening when said door covers said access opening, so that said storage enclosure is water tight.

5. The combination seat and storage device of claim 1 wherein the door is maintained in a closed position by a frictional engagement with the storage enclosure.

6. The combination seat and storage device of claim 1 further including padding positioned on the top of said storage enclosure.

7. The combination seat and storage device of claim 1 further including a pair of belt retainers, each belt retainer extending from a side of said storage enclosure and being positioned so that said belt can be threaded through said belt retainers to stabilize said storage enclosure as it is worn about the wearer's waist.

8. The combination seat and storage device of claim 1 wherein said storage enclosure and door are textured so that said storage enclosure and said door do not reflect light.

9. The combination seat and storage device of claim 1 wherein said storage enclosure is covered with a sound deadening material.

10. The combination seat and storage device of claim 1 further including a door retainer which allows said door to be opened so that said storage cavity can be accessed without spilling the contents of said storage cavity.

11. The combination seat and storage device of claim 1 wherein said storage enclosure and said door are formed from a plastic material selected from the group consisting of polyethylene, polypropylene, polyurethane, polyvinyl chloride, vinyl esters, nylon, polyester and epoxides.

12. A combination seat and storage device comprising:
    a storage enclosure defining a storage cavity, and an access opening thereto, said storage enclosure further including a first side having a support engaging portion and two laterally disposed portions having larger radii for engaging a waist of a wearer; and a belt attached to said storage enclosure, said belt being adjustable from a first position at which said belt can be secured about the waist of the wearer to a second position at which said belt can be secured around a generally vertical support;

wherein said storage enclosure can be worn about the wearer's waist by engaging the wearer's waist with said two laterally disposed portions and adjusting said belt to said first position and said storage enclosure can be secured to the generally vertical support by engaging said support engaging portion with the generally vertical support and adjusting said belt to said second position; and wherein said support engaging portion includes a first engaging surface and a second engaging surface, said first engaging surface and said second engaging surface forming a V-shape which facilitates engagement of said storage enclosure with the generally vertical support.

13. The combination seat and storage device of claim 12 further including a door positioned on a second side of said storage enclosure opposite said first side, said door covering said access opening and said door being supported by a hinge which allows said door to pivot downwardly.

14. The combination seat and storage device of claim 12 further including a pair of belt retainers mounted on said first side of said storage enclosure such that, when said belt is threaded through said belt retainers, said storage enclosure is stabilized about the wearer's waist.

15. The combination seat and storage device of claim 12 further including a mesh or netting which covers said access opening.

16. The combination seat and storage device of claim 12 further including a tooth extending perpendicularly from said first side of said storage enclosure, said tooth being provided to prevent said storage enclosure from sliding once it is attached to the generally vertical support.

\* \* \* \* \*